United States Patent [19]

Kubota et al.

[11] Patent Number: 5,656,987

[45] Date of Patent: Aug. 12, 1997

[54] RESISTANCE TEMPERATURE SENSOR

[75] Inventors: Teppei Kubota; Kazuto Miyagawa; Hiroji Tani; Tohru Kasanami, all of Kyoto, Japan

[73] Assignee: Murata Manufacturing Co., Ltd., Japan

[21] Appl. No.: 196,951

[22] Filed: Feb. 15, 1994

[30] Foreign Application Priority Data

Feb. 18, 1993 [JP] Japan .................................. 5-029294

[51] Int. Cl.⁶ ...................................................... H01C 7/06
[52] U.S. Cl. ........................ 338/7; 338/25; 338/22 R; 338/28
[58] Field of Search .............................. 338/25, 7, 121, 338/122, 292, 293, 333, 22 R, 28; 374/185

[56] References Cited

U.S. PATENT DOCUMENTS

| | | | |
|---|---|---|---|
| 4,345,465 | 8/1982 | Gruner et al. | 338/28 |
| 4,375,056 | 2/1983 | Baxter et al. | 338/25 |
| 4,464,646 | 8/1984 | Burger et al. | 338/25 |
| 5,197,804 | 3/1993 | Tani et al. | 338/25 X |
| 5,202,665 | 4/1993 | Hafele | 338/25 |

FOREIGN PATENT DOCUMENTS

| | | |
|---|---|---|
| 289127 | 4/1991 | Germany. |
| 4036109 | 5/1991 | Germany. |

OTHER PUBLICATIONS

English abstract to Hans–Dieter et al. E. Germ. DD289127 (Apr. 1991).

*Primary Examiner*—Teresa J. Walberg
*Assistant Examiner*—Karl Easthom
*Attorney, Agent, or Firm*—Ostrolenk, Faber, Gerb & Soffen, LLP

[57] ABSTRACT

In order to improve uniformity of temperature distribution, despite heat which is generated in a resistance circuit and flows into a support part thereby causing a high output, a resistance circuit is provided with first, second and third regions having different resistance values so that the third region which is in proximity to the support part has the highest resistance value.

7 Claims, 4 Drawing Sheets

RESISTANCE TEMPERATURE SENSOR

BACKGROUND OF THE INVENTION

1. Field of the Invention

The present invention relates to a resistance temperature sensor, and more particularly, it relates to a resistance temperature utilizing a property such that the resistance value of a resistor is varied with the temperature.

2. Description of the Background Art

FIG. 6 shows a conventional resistance temperature sensor 1, which is of interest to the present invention. This resistance temperature sensor 1 comprises an electrical insulating substrate 2 which is made of alumina, for example. A support part 3 is provided on one side portion of the insulating substrate 2 to be in contact with a member for supporting the resistance temperature sensor 1, while a circuit part 4 is provided on another side portion thereof. A zigzagging resistance circuit 5 is formed on the circuit part 4 of the insulating substrate 2. The resistance circuit 5, which is formed by a metal thin film of platinum, for example, is given a zigzagging form in the following manner:

A metal thin film is formed over the entire surface of the circuit part 4 of the insulating substrate 2 by sputtering, plating or baking with organic metal resinate, and provided with grooves 6 by irradiation with a laser, dry etching or wet etching. These grooves 6 divide the metal thin film, to define the zigzagging resistance circuit 5. A groove 7 which is formed by a similar method defines a boundary between terminal electrodes 8 and 9, which are connected with respective end portions of the resistance circuit 5. Further, grooves 10 are formed by a similar method along peripheral edges of the insulating substrate 2. Even if the metal thin film is partially separated from an end thereof, such separation is effectively stopped by a corresponding one of the grooves 10. Metal thin films defining the terminal electrodes 8 and 9 are formed simultaneously with the metal thin film forming the circuit part 4.

The terminal electrodes 8 and 9 are connected with lead wires (not shown) respectively.

In order to attain a high output in such a resistance temperature sensor 1, it is preferable to maximize the width of a region having a uniform temperature which is affected by heat generation of the resistance circuit 5. To this end, the metal thin films provided in the circuit part 4 are formed with constant thicknesses and the resistance circuit 5 is formed with a constant circuit width in general. Namely, resistance values in the respective portions are set at constant levels over the entire resistance circuit 5, so that the overall resistance circuit 5 uniformly generates heat.

When the resistance circuit 5 of the resistance temperature sensor 1 having the aforementioned structure is energized and subjected to measurement of temperature distribution, however, a result shown in the lower part of FIG. 6 is obtained. It is understood from FIG. 6 that relatively large heat escape based on heat conduction or the like exists at a side portion of the circuit part 4 which is close to the support part 3, i.e., a non-heating part, leading to a tendency to increase heat loss and thereby reduce uniformity of temperature distribution. Therefore, an output characteristic of the resistance temperature sensor 1 with respect to temperature change is reduced.

SUMMARY OF THE INVENTION

Accordingly, an object of the present invention is to provide a resistance temperature sensor which can further increase the width of a region having uniform temperature distribution, in order to attain a high output.

The present invention is directed to a resistance temperature sensor comprising an electrical insulating substrate and a zigzagging resistance circuit which is formed on the insulating substrate. In order to solve the aforementioned technical problem, the resistance circuit has a plurality of regions having different resistance values, so that a region having relatively large heat escape provides a relatively high resistance value.

When a support part is provided on one side portion of the insulating substrate in the present invention, the resistance circuit is formed on a region excluding the support part. In this resistance circuit, resistance values of a region which is in proximity to the support part and another region which is located on the other side portion of the insulating substrate are preferably relatively increased.

When support parts are provided on both side portions of the insulating substrate and the resistance circuit is formed on a region excluding the support parts, on the other hand, resistance values of regions of the resistance circuit which are in proximity to the support parts are preferably relatively increased.

According to the present invention, a portion of the resistance circuit providing a relatively high resistance value has a relatively high heating value. Thus, a region having relatively high heat escape has a high heating value, whereby it is possible to promote uniformity of temperature distribution in the overall resistance circuit.

According to the present invention, therefore, a region having a uniform temperature is so enlarged that a high output can be attained in the resistance temperature sensor as the result.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
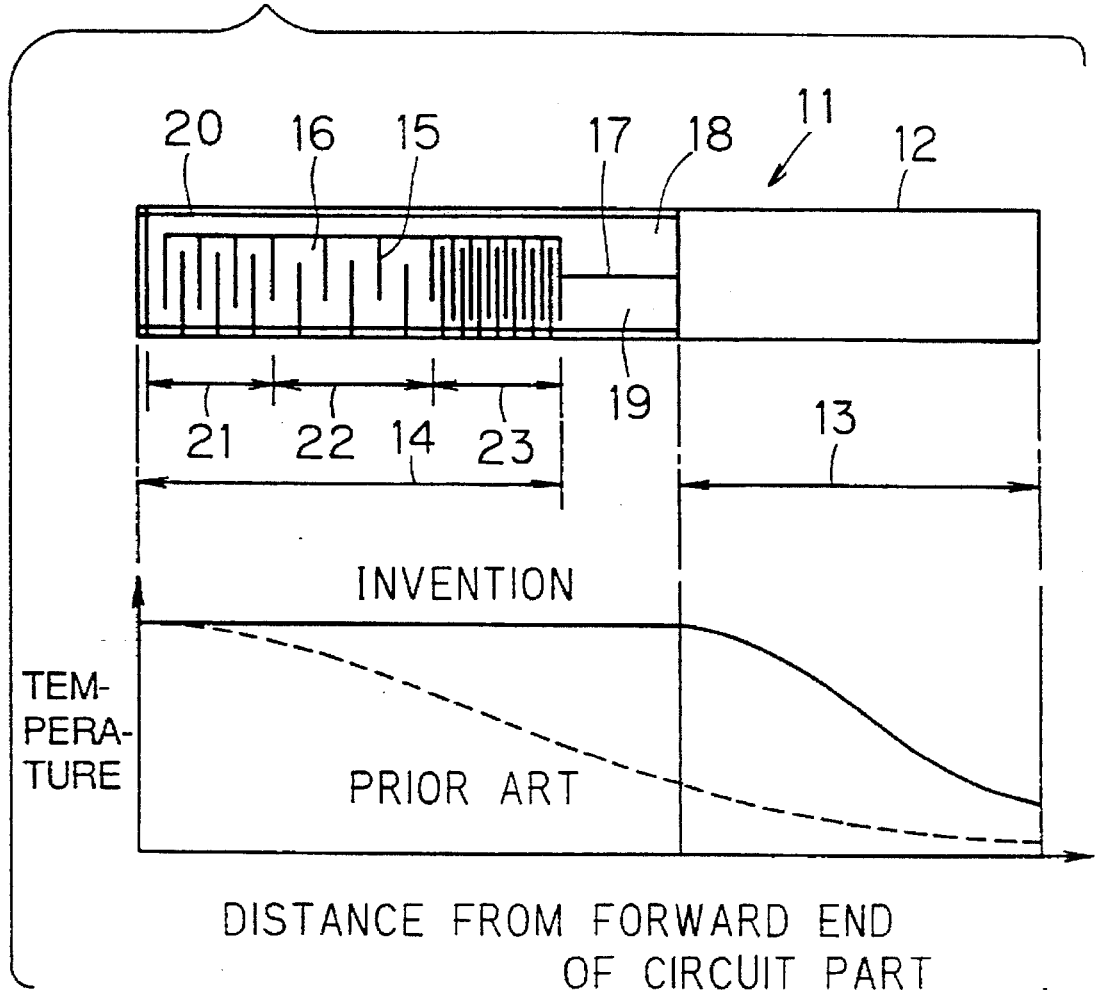
FIG. 1 is a front elevational view showing a resistance temperature sensor 11 according to a first embodiment of the present invention, with temperature distribution provided by this resistance temperature sensor 11.

FIG. 1 shows a resistance temperature sensor 11 according to a first embodiment of the present invention. This resistance temperature sensor 11 comprises an electrical insulating substrate 12 which is made of alumina, for example. A support part 13 is provided on one side portion of the insulating substrate 12, while a circuit part 14, which is provided by a metal thin film of platinum, for example, is formed on a region of the insulating substrate 12 excluding the support part 13.

This metal thin film is formed by a method which is similar to that in the aforementioned prior art. Further, grooves 15 are formed in the metal thin film by a method similar to that in the prior art, thereby defining a zigzagging resistance circuit 16. In addition, a groove 17 is formed to separate terminal electrodes 18 and 19 which communicate with respective end portions of the resistance circuit 16 from each other, while grooves 20 are formed to prevent separation of the metal thin film in portions of the resistance circuit 16.

The resistance circuit 16 has first, second and third regions 21, 22 and 23 which are different in circuit width from each other. The second region 22 has the largest circuit width and the third region 23 has the smallest circuit width, while the first region 21 has an intermediate circuit width. Therefore, resistance values provided by the regions 21 to 23, i.e., heating values, are in a relation of (third region 23)>(first region 21)>(second region 22).

Such a relation of the resistance values, i.e., heating values, is so selected that the largest heating value in the third region 23 compensates for the quantity of heat escaping from the resistance circuit 16 toward the support part 13. The second region 22, which is positioned as a heat sink receiving heat from both of the first and third regions 21 and 23, is rendered to have the smallest heating value itself. Further, the first region 21 is rendered to have a smaller heating value than the third region 23, in consideration of the relation to the third region 23 which must compensate for the heat flowing toward the support part 13 and generate the heat flowing into the second region 22.

Figure 6:
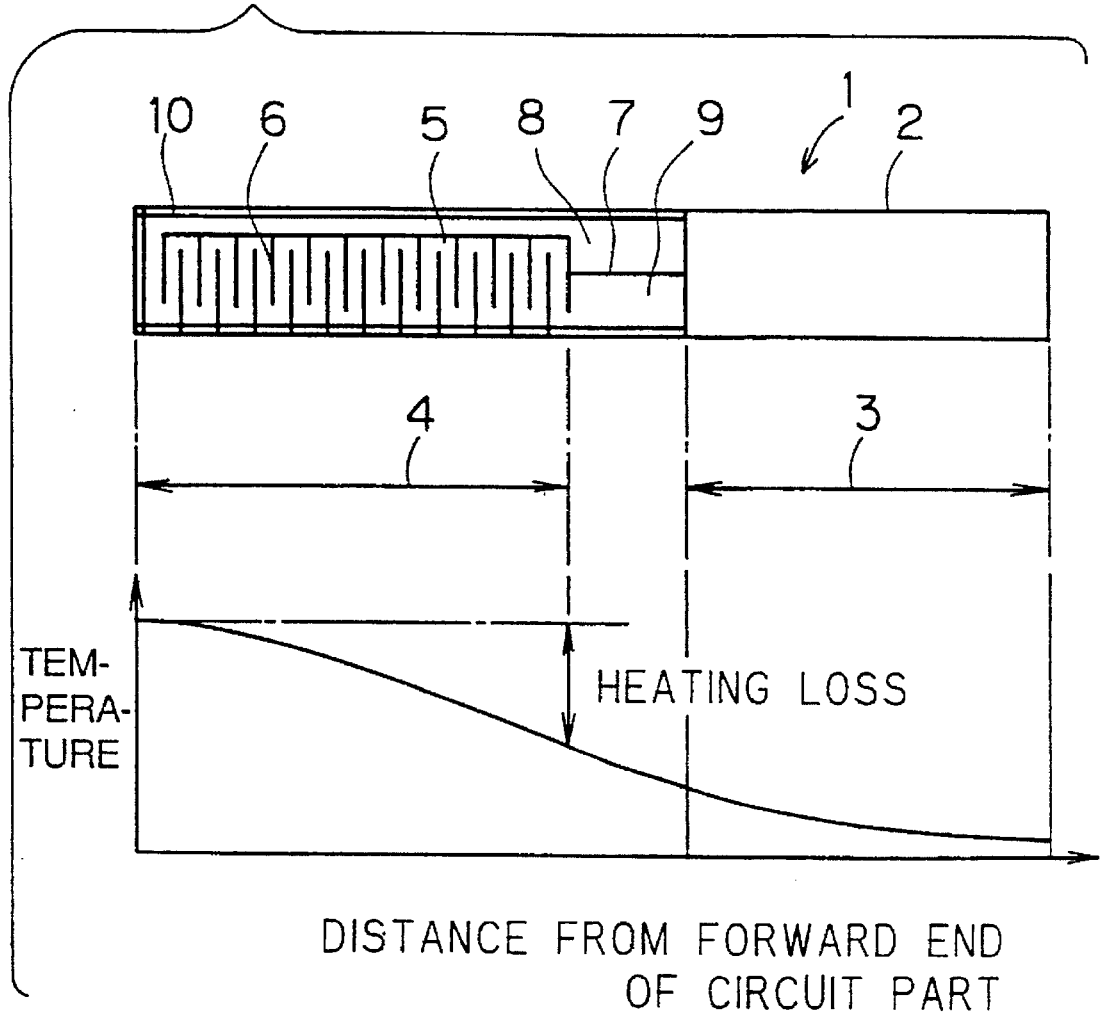
FIG. 6 is a front elevational view showing a conventional resistance temperature sensor 1, with temperature distribution provided by this resistance temperature sensor 1.

Thus, temperature distribution in the circuit part 14 is uniformalized as shown by a solid line in a lower part of FIG. 1. A broken line shows temperature distribution which is provided by the conventional resistance temperature sensor 1 shown in FIG. 6.

Figure 2:
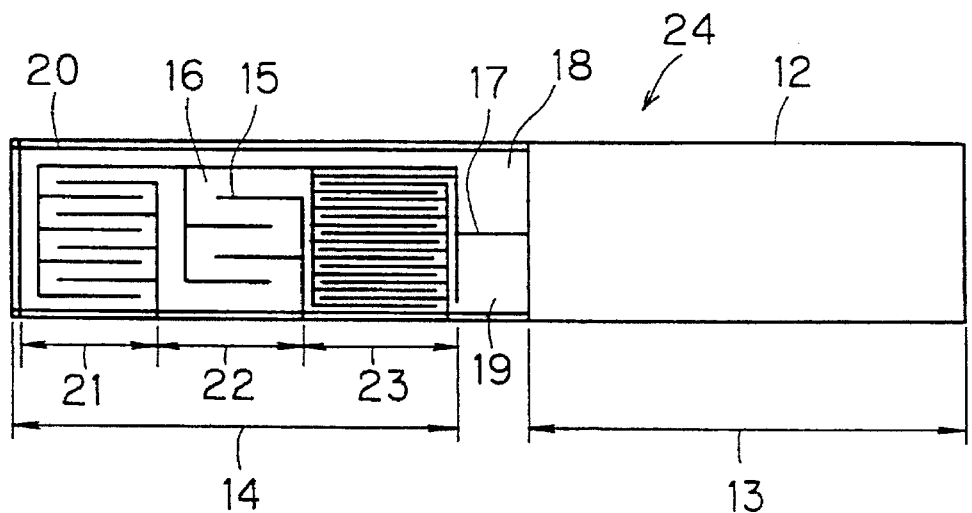
FIG. 2 is a front elevational view showing a resistance temperature sensor 24 according to a second embodiment of the present invention.

FIG. 2 shows a resistance temperature sensor 24 according to a second embodiment of the present invention. Referring to FIG. 2, elements corresponding to those shown in FIG. 1 are denoted by similar reference numerals, and only a structure which is different from that of the first embodiment is hereafter described.

Referring to FIG. 2, a resistance circuit 16 cross-directionally zigzags along an insulating substrate 12 in respective ones of first, second and third regions 21, 22 and 23. However, circuit widths, resistance values and heating values of the regions 21 to 23 are in relations similar to those of the embodiment shown in FIG. 1. Therefore, the resistance temperature sensor 24 shown in FIG. 2 has an effect which is substantially similar to that of the resistance temperature sensor 11 shown in FIG. 1.

Figure 3:
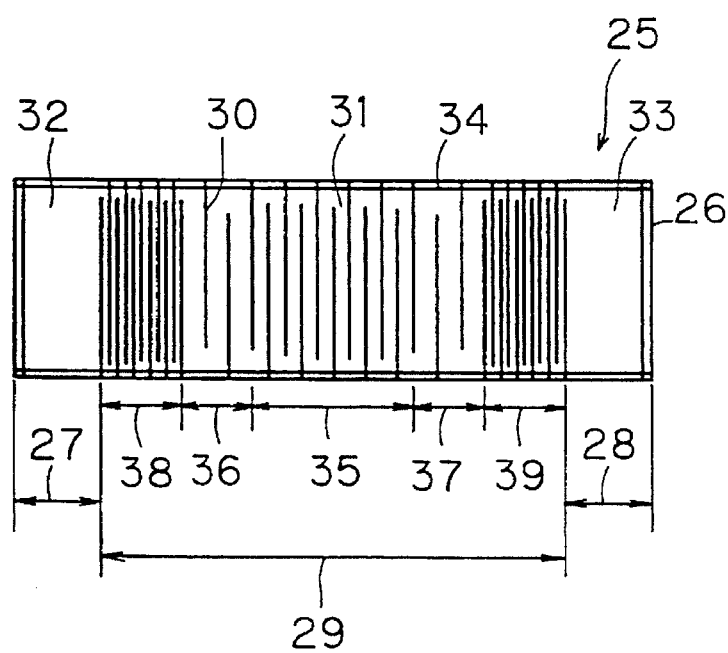
FIG. 3 is a front elevational view showing a resistance temperature sensor 25 according to a third embodiment of the present invention.

FIG. 3 shows a resistance temperature sensor 25 according to a third embodiment of the present invention. This resistance temperature sensor 25 is provided with support parts 27 and 28 on both side portions of an insulating substrate 26 respectively. A metal thin film is formed entirely over the insulating substrate 26, to define a circuit part 29 along the overall surface of the insulating substrate 26. A resistance circuit 31 is provided on a central portion of the circuit part 29 to zigzag by formation of grooves 30, while terminal electrodes 32 and 33 are arranged to communicate with respective end portions of the resistance circuit 31. According to this embodiment, portions provided with the terminal electrodes 32 and 33 substantially define the support parts 27 and 28. Alternatively, regions provided with no metal thin films may be provided outwardly beyond the terminal electrodes 32 and 33, to serve as support parts. Grooves 34 are formed along peripheral edges of the insulating substrate 26, with functions similar to those of the grooves 20 shown in FIG. 1.

The resistance circuit 31 has a first region 35, second regions 36 and 37 and third regions 38 and 39, which are different in circuit width from each other. The first region 35, the second regions 36 and 37 and the third regions 38 and 39 have functions similar to those of the aforementioned first, second and third regions 21, 22 and 23 respectively, and hence circuit widths, resistance values and heating values thereof are also selected in similar relations.

Figure 4:
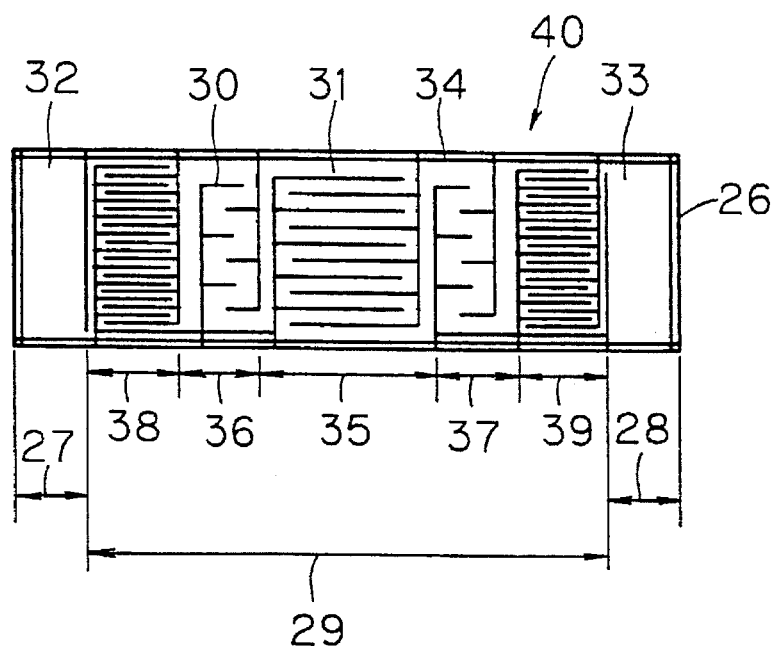
FIG. 4 is a front elevational view showing a resistance temperature sensor 40 according to a fourth embodiment of the present invention.

FIG. 4 shows a resistance temperature sensor 40 according to a fourth embodiment of the present invention. Referring to FIG. 4, elements corresponding to those shown in FIG. 3 are denoted by similar reference numerals, and only a different structure is hereafter described.

Referring to FIG. 4, a resistance circuit 31 cross-directionally zigzags along an insulating substrate 26 in respective ones of a first region 35, second regions 36 and 37 and third regions 38 and 39. Other points of this embodiment are substantially similar to those of the embodiment shown in FIG. 3.

Figure 5:
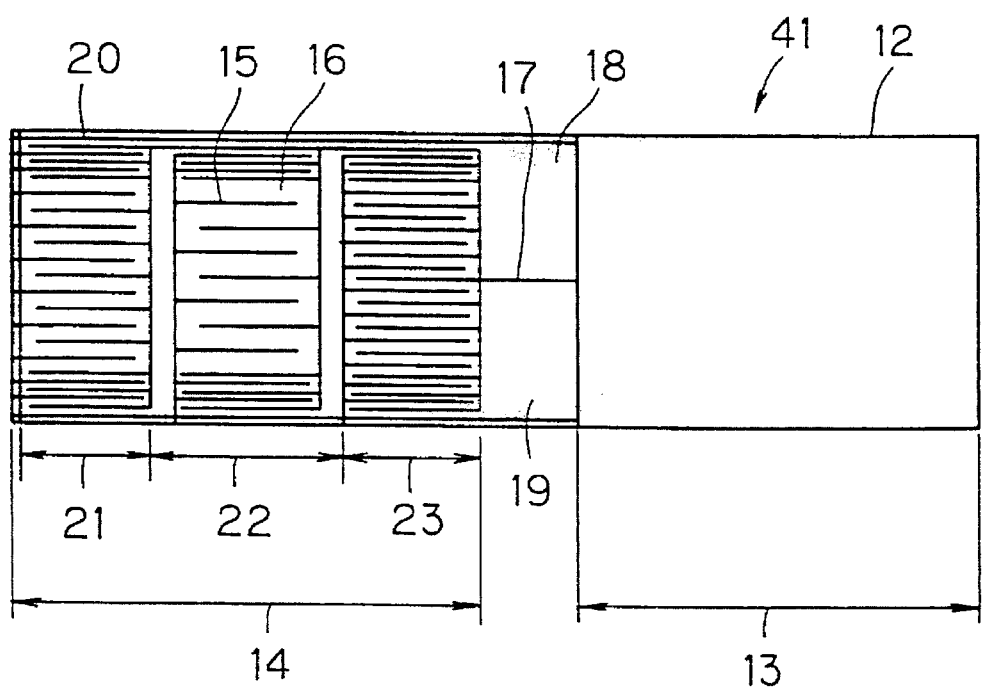
FIG. 5 is a front elevational view showing a resistance temperature sensor 41 according to a fifth embodiment of the present invention.

FIG. 5 shows a resistance temperature sensor 41 according to a fifth embodiment of the present invention. This embodiment is most similar to the aforementioned embodiment shown in FIG. 2. Referring to FIG. 5, therefore, elements similar to those shown in FIG. 2 are denoted by similar reference numerals, and redundant description is omitted.

In the resistance temperature sensor 41 shown in FIG. 5, temperature distribution is taken into consideration not only in the longitudinal direction of an insulating substrate 12 but in the cross direction. Namely, circuit widths of first, second and third regions 21, 22 and 23 are narrowed toward cross-directional ends of the insulating substrate 12, thereby providing higher resistance values. Thus, heat can flow from the cross-directional ends toward the cross-directional center of the insulating substrate 12, whereby the temperature distribution can be uniformalized also in relation to the cross direction.

In the respective embodiments, conductor films of Au or the like or solder films may be formed on the terminal electrodes 18, 19, 32 and 33 so that lead wires or lead frames are fixed thereto by welding or soldering and the fixed parts are further covered with glass or resin.

While the present invention has been described with reference to various embodiments, some other modifications are also available within the scope of the present invention.

For example, the resistance circuit may be provided only with two regions having different resistance values, although the same is provided with three regions of the first to third regions in each of the aforementioned embodiments. Also in this case, it is possible to further uniformalize temperature distribution at least in comparison with the conventional resistance temperature sensor 1 shown in FIG. 1. The resistance circuit may further alternatively be provided with four or more regions, as a matter of course.

Although the resistance values are varied stepwise in the respective regions of the resistance circuit in each of the aforementioned embodiments, the resistance values may alternatively be continuously varied in a stepless manner between the respective regions.

Further, the difference between the resistance values, i.e., heating values between the regions, or area rates of the respective regions can be arbitrarily changed in consideration of uniformity of temperature distribution. In other words, the difference between the resistance values of these regions, or area rates of the respective regions must be selected in consideration of factors such as heat conductivity of the material forming the insulating substrate, the dimensions and the shape of the insulating substrate, the area rate of the resistance circuit provided on the insulating substrate, thermal properties such as thermal capacity and thermal conductivity of another member which is in contact with the support part and the like, for example.

In the second region having a relatively large circuit width, it is possible to easily adjust the number or lengths of the grooves provided therein, thereby easily trimming the resistance value.

Although the present invention has been described and illustrated in detail, it is clearly understood that the same is by way of illustration and example only and is not to be taken by way of limitation, the scope of the present invention being limited only by the terms of the appended claims.

What is claimed is:

1. A resistance temperature sensor comprising:
   an electrical insulating substrate having a surface;
   a resistance circuit on said surface of said insulating substrate, said resistance circuit having a plurality of zigzagging resistive portions;
   a support part provided on one side portion of said surface of said insulation substrate, said resistance circuit being formed on a region excluding said support part;
   said zigzagginig resistive portions being defined by a plurality of gaps, the gaps in a first of said zigzagging resistive portions defining a narrower resistor width than gaps in other of said zigzagging resistive portions so that the resistance value of said first portion is higher than the resistance value in said other zigzagging portions; and
   said plurality of zigzagging portions being arranged such that said first zigzagging portion is closer to said support part than said other of said zigzagging portions.

2. A resistance temperature sensor in accordance with claim 1, wherein said resistance circuit comprises a metal thin film being formed on said insulating substrate, said metal thin film being divided by formation of a groove, to be brought into a zigzagging form.

3. A resistance temperature sensor in accordance with claim 2, wherein said metal thin film includes a platinum thin film.

4. A resistance temperature sensor in accordance with claim 1, wherein support parts are provided on two side portions of said surface of such insulating substrate respectively and said resistance circuit is formed on a region excluding said support parts, zigzagging portions of said resistance circuit closest to respective said support parts being increased in resistance value relative to zigzagging portions farthest from said support parts.

5. A resistance temperature sensor in accordance with claim 1, wherein said insulating substrate has longitudinal and cross-directional dimensions being perpendicular to each other, said plurality of zigzagging portions of said resistance circuit having different resistance values being distributed along the longitudinal direction of said insulating substrate.

6. A resistance temperature sensor in accordance with claim 5, wherein said plurality of zigzagging portion of said resistance circuit having different resistance values are further distributed along the cross direction of said insulating substrate.

7. A resistance temperature sensor comprising:
   an electrical insulating substrate having a surface and a support part on said surface;
   a zigzagging resistance circuit said surface of said insulating substrate adjacent said support part,
   said resistance circuit being provided with a plurality of zigzagging regions, having different resistance values;
   wherein said resistance circuit comprises a metal thin film being formed of said insulating substrate, said metal thin film being divided by formation of grooves to define said zigzagging region;
   wherein said plurality of regions having different resistance values are provided by varying widths of respective parts of said metal thin film being divided by said grooves; and are arranged such that a region of said plurality of zigzagging regions having a highest resistance value is arranged closer to said support part than any other region of said plurality of zigzagging regions.

* * * * *